United States Patent [19]

Metroka

[11] Patent Number: 5,029,233

[45] Date of Patent: Jul. 2, 1991

[54] RADIO ARRANGEMENT HAVING TWO RADIOS SHARING CIRCUITRY

[75] Inventor: Michael P. Metroka, Algonquin, Ill.

[73] Assignee: Motorola, Inc., Schaumburg, Ill.

[21] Appl. No.: 107,227

[22] Filed: Oct. 9, 1987

[51] Int. Cl.$^5$ .............................................. H04B 7/15
[52] U.S. Cl. ....................................... 455/11; 455/33; 455/54; 455/186
[58] Field of Search .................... 455/11, 33, 34, 74, 455/88, 53, 54, 57, 58, 68, 70, 89, 186, 151; 379/58–63; 340/825.57, 825.69

[56] References Cited

U.S. PATENT DOCUMENTS

| | | | |
|---|---|---|---|
| 4,213,009 | 7/1980 | Suzuki . | |
| 4,284,848 | 8/1981 | Frost | 455/11 |
| 4,369,516 | 1/1983 | Byrns | 375/110 |
| 4,422,071 | 12/1983 | de Graaf | 340/825.44 |
| 4,508,935 | 4/1985 | Mastromoro . | |
| 4,529,980 | 7/1985 | Liotine et al. | 340/825.52 |
| 4,535,333 | 8/1985 | Twardowski | 340/825.69 |
| 4,553,263 | 11/1985 | Smith et al. | 455/54 |
| 4,593,155 | 6/1986 | Hawkins | 455/89 |
| 4,622,695 | 11/1986 | Whiting | 455/58 |
| 4,636,741 | 1/1987 | Mitzlaff | 330/127 |
| 4,646,345 | 2/1987 | Zdunek et al. . | |
| 4,680,787 | 7/1987 | Marry | 379/63 |
| 4,688,261 | 8/1987 | Killoway et al. | 455/186 |
| 4,700,375 | 10/1987 | Reed | 455/89 |
| 4,742,560 | 5/1988 | Arai | 455/33 |
| 4,792,986 | 12/1988 | Garner et al. | 455/186 |

FOREIGN PATENT DOCUMENTS 0169726 7/1985 European Pat. Off. .
2118340A 3/1983 United Kingdom .

OTHER PUBLICATIONS

Proceedings of IEEE, vol. 75, No. 4, Apr. 1987, "Universal Digital Portable Radio Communications", by Donald C. Cox.
"Cellular Business", Aug. 1987, pp. 48 and 49.
"Personal Communications Technology", Sep. 1986, C-450.
Motorola's Vehicle Adapter, Instruction Manual No. 68P81063E50-B.
Ge/Mitsubishi Booster (FCC Filing Excerpts).
Motorola DYNATAC 6000X Universal Mobile Telephone (Brochure and Engineering Description).

Primary Examiner—Curtis Kuntz
Attorney, Agent, or Firm—Raymond A. Jenski; Rolland R. Hackbart

[57] ABSTRACT

A radio arrangement and method allows a portable (210) and a mobile (212) to uniquely communicate on a radio system having at least one remote system site (114). The portable (210) has at least one information set (such as the radio's identification information and repertory dialing information) (356 or 360), and the mobile (212) is intercoupled therewith via a connector (214). The connector is used for transferring a code, which designates the information set, from the portable (210) to the mobile (212), whereby the mobile (212) adopts the information set of the portable (210) for subsequent communication. The arrangement offers an user having a portable, with its limited features and functions, to utilize all of the capabilities of the mobile.

37 Claims, 4 Drawing Sheets

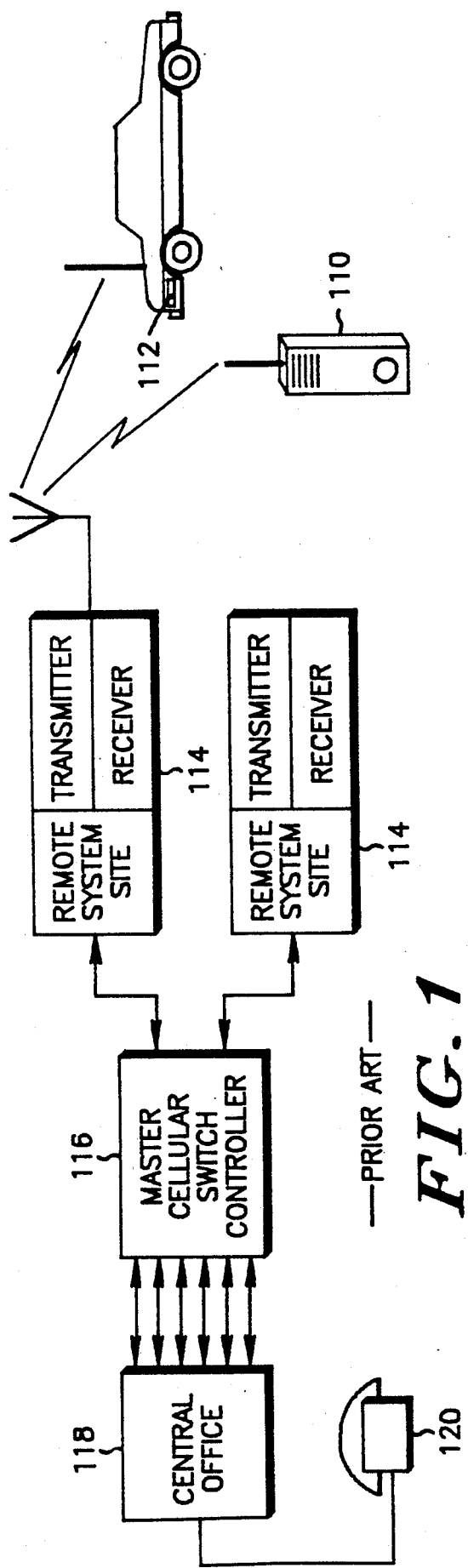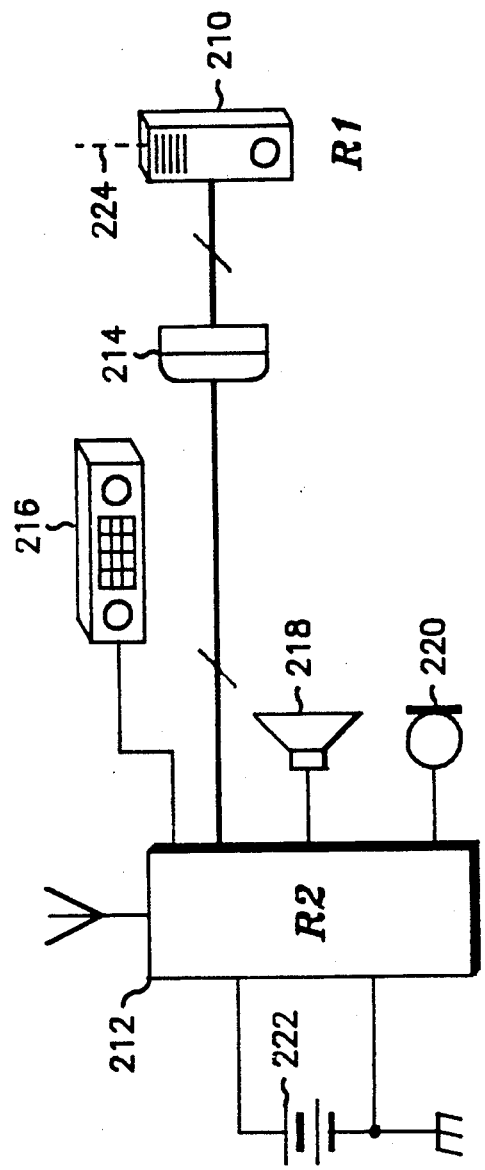
FIG. 1 —PRIOR ART—
FIG. 2

MOBILE

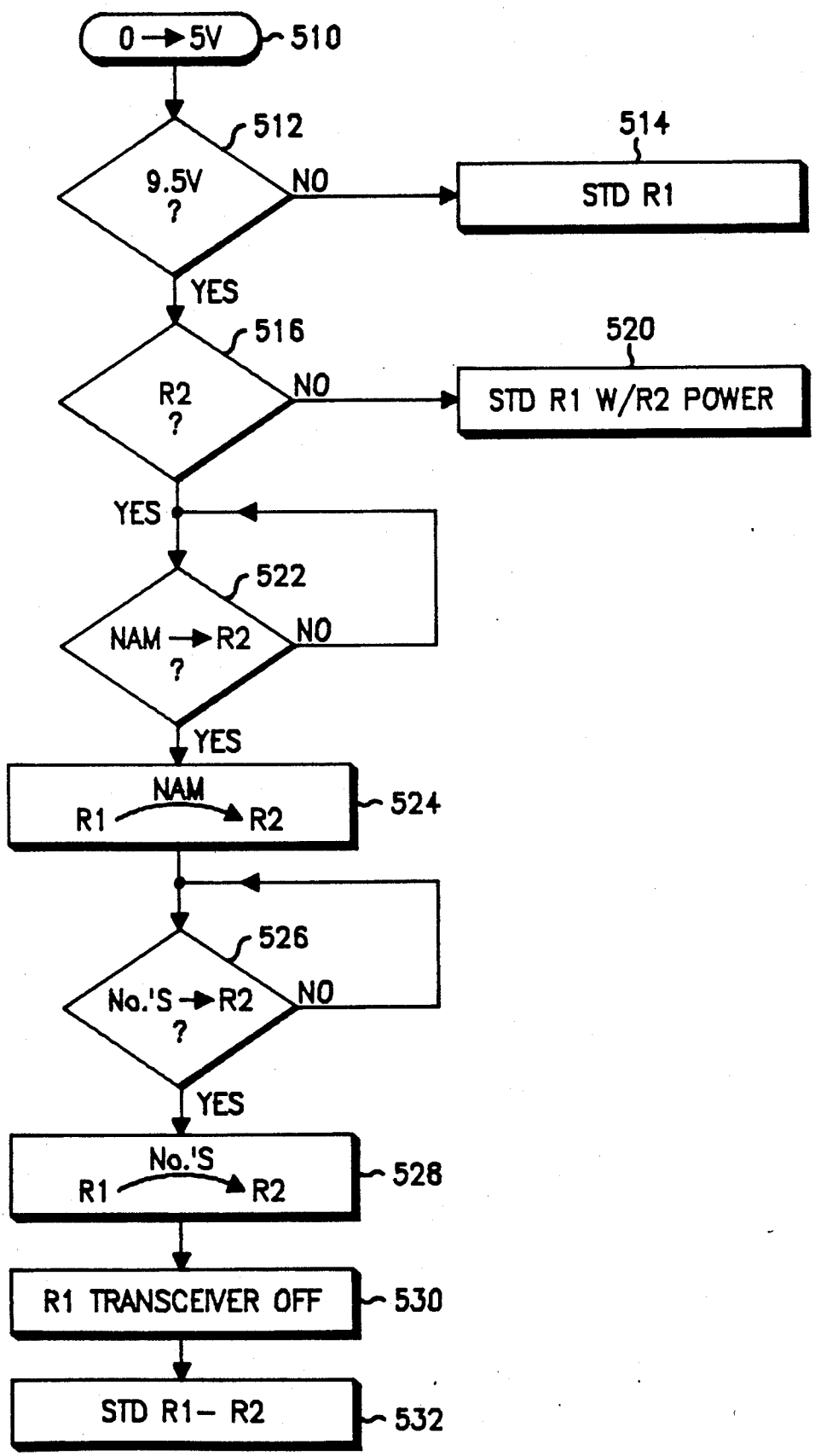

RADIO ARRANGEMENT HAVING TWO RADIOS SHARING CIRCUITRY

FIELD OF THE INVENTION

The present invention relates generally to RF communication systems, and particularly to mobile and portable radios for use on a cellular communication system.

BACKGROUND ART

RF communications systems are well known in the art. In many such systems, vehicles are equipped with mobile radios that allow an user to communicate with one or more base stations and also with other similarly equipped vehicles in the system. Such a system typically includes a vehicle mounted radio (hereinafter referred to as a mobile), an antenna and a handset (or microphone, speaker and control head). In addition, a base station at a remote system site generally communicates with the vehicle mounted equipment and typically serves to link the radio with a data terminal or operator.

The above configuration works well, so long as the user remains in the vehicle. Once the user moves beyond the operational range of the microphone, however, the user typically loses the ability to forward communications to the base station. To meet this problem, portable radios (hereinafter referred to as portables) have been used to allow the user to communicate with the base station when separated from the vehicle. The portable must, in order to be effective, emulate the mobile in all basic aspects, including frequency and signalling capabilities. Unfortunately, due to size and power supply constraints, known portables have failed to emulate some of the more important mobile characteristics including power output rating, speaker phone, diversity and speech recognition/synthesis capabilities.

In most every cellular system, each individual radio, portable or mobile, has one or more unique associated information sets, one of which includes NAM data (e.g., phone number, system ID, system channel scan data and serial number). The phone number of the NAM data is used by the cellular systems to identify the radio using the system.

In instances where the user controls both the portable and the mobiles, the user incurs an unjustified cost. Because each radio has its own unique telephone number, the user is billed separately for each radio. Thus, the user's minimum monthly costs are doubled.

There therefore exists a need to provide relatively inexpensive, effective, and reliable communications for those who ordinarily make use of a vehicle mounted radio but who must also carry on communications away from the vehicle from time to time.

OBJECTS OF THE INVENTION

It is a general object of the present invention to provide a radio arrangement which overcomes the aforementioned deficiencies.

It is a more specific object of the present invention to provide a radio arrangement which includes a mobile and a portable which are intercompatible in that costs, features and functions may be shared or separated at the convenience of the user.

BRIEF DESCRIPTION OF THE DRAWINGS

FIG. 1 is a diagram of a prior art mobile/portable arrangement;

FIG. 2 is a diagram of a mobile/portable arrangement, in accordance with the present invention;

FIG. 5 is a flowchart depicting a set of steps, in accordance with the present invention, which may be used by the microcomputer 336 of FIG. 3 for implementing the present invention with respect to the portable.

DETAILED DESCRIPTION OF THE PREFERRED EMBODIMENT

Figure 3:
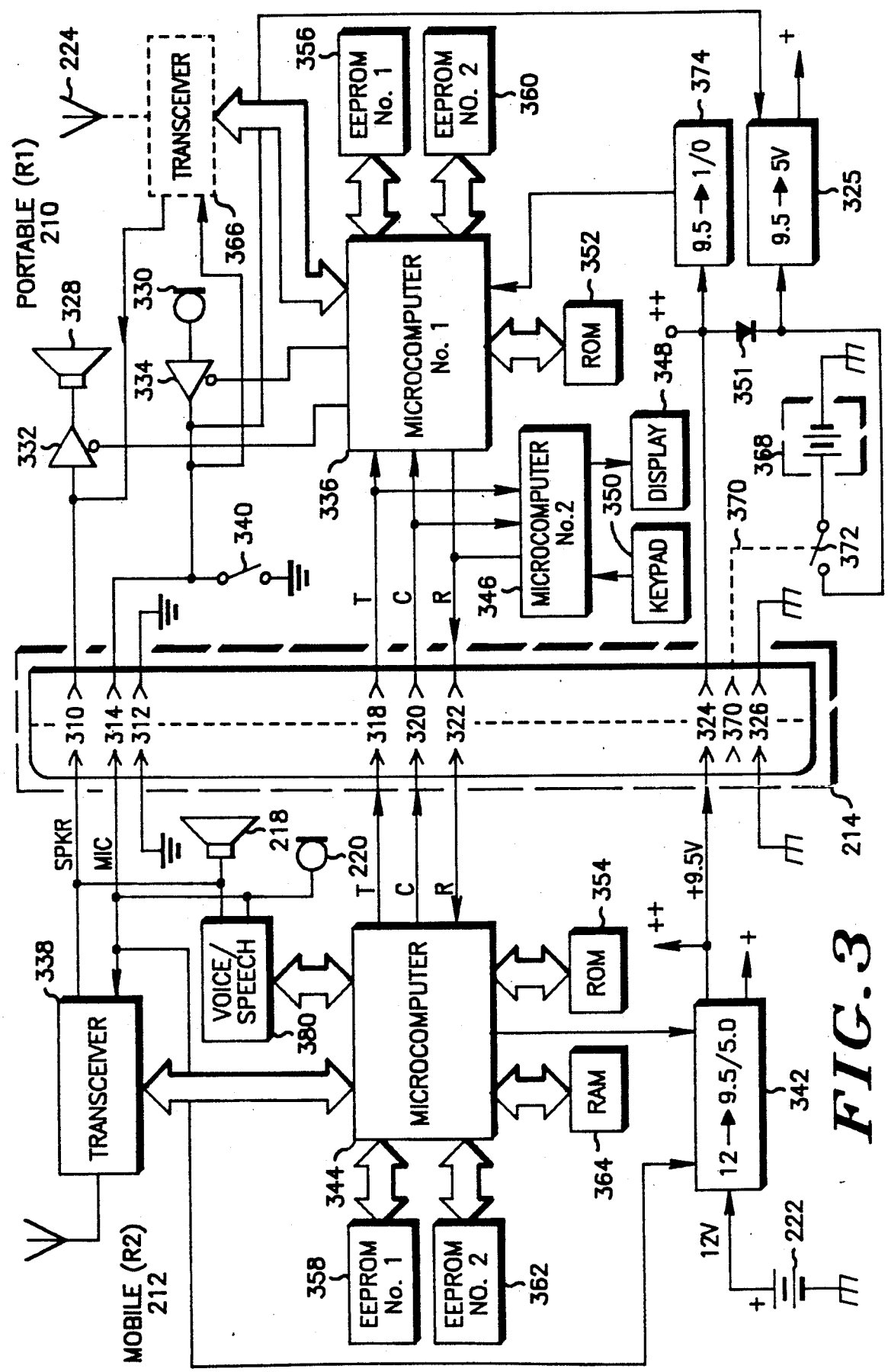
FIG. 3 is an expanded diagram of FIG. 2.

In FIG. (FIG.) 1, a conventional cellular communication system is illustrated. The system includes a portable 110, a mobile 112 installed in the trunk of a vehicle, and at least one remote system site (RSS) 114 which includes a transmitter (TX) and receiver (RX) for establishing a duplex communication link between the radios 110 and 112 and a master cellular switching center (MCSC) 116. The MCSC 116 couples the communication link to a central office (C/O) 118 for communication with a wireline phone 120 or another radio coupled into the system.

The novel arrangement disclosed in this specification has particular use for combining the circuitry of two cellular radios, eg. 110 and 112, such that the previously discussed disadvantages are overcome. More specifically, the arrangement is directed to intercoupling a portable and a mobile in such a manner that their circuitry may be shared while communicating on a cellular system.

Such an arrangement is illustrated in FIG. 2 wherein a portable (R1) 210 and a mobile (R2) 212 are shown intercoupled through a connector 214. The mobile 212 is shown to include a number of peripherals such as a handset 216 for user communications, and a speaker 218 and microphone 220 which may be used for voice-speaker phone operations and/or for voice simulation and recognition by the radio 212. As will be discussed below, although both radios 210 and 212 can be implemented so that they are fully capable of communicating on a cellular system independently, while the radios are intercoupled the vehicle battery 222 is used to supply power to both radios 210 and 212, and the portable antenna (shown in dotted lines) 224 is not used.

The intercoupling provided by the connector 214 allows the portable 210 and the mobile 212 to utilize each other's circuitry and to communicate with each other. In the preferred embodiment, the communication includes signalling transfers such as: intersignalling between the radios to indicate if the intercoupling is present, an actual transfer of programmed information which includes the NAM data and repertory dial information, and intersignalling which permits the portable 210 to utilize circuitry features which are inherent to the mobile 212 such as transceiver characteristics (eg., transmitter power, receiver sensitivity, antenna characteristics, and, when available, speaker phone functions, diversity, and speech synthesis and voice recognition capabilities).

FIG. 3 illustrates details of the connector 214, the portable 210 and the mobile 212. The connector includes only eight electrical connections between the radios. These connections comprise a speaker connection 310 from the mobile to the portable, a microphone connection 314 from the portable to the mobile, ground 312 for connections 310 and 314, data transfer connections 318, 320 and 322, a 9.5 Volt connection 324 from the mobile to the portable and a chassis ground connection 326.

The connections 310, 312 and 314 are audio connections which allow the portable to act as a handset, with regards to the audio functions, for the mobile while the two radios are intercoupled. A speaker 328 and a microphone 330, conventional in portables, are coupled to the audio connections 310, 312 and 314 through mute gates 332 and 334 to provide this function. The mute gates may be controlled by microcomputers (u-C) 336 and 346 as is conventionally provided in stand alone portables or mobiles. See, for example, Motorola Instruction Manual Nos. 68P81070E40 and 68P81046E60, entitled "DYNA TAC Cellular Mobile Telephone Instruction Manual" and "DYNA TAC Cellular Portable Telephone Instruction Manual" repectively. Both manuals are available from Motorola C & E Parts, 1313 Algonquin Rd., Schaumburg, Ill., 60196, U.S.A.

The audio connections (310, 312, and 314) are coupled to a conventional mobile transceiver (XCVR) 338 for communication with the RSSs 114 (FIG. 1).

Included with the audio connections is the on-off function of the portable. The portable includes an on-off switch 340 which is controlled by the user to enable power to the portable from the mobile, or, in this case where the portable is not intercoupled with the mobile, to enable power to the portable from the portable's internal battery 368. Power is enabled or disabled when the switch 340 is momemtarily closed, thereby momemtarily grounding the microphone connection 314. A regulator 342 is enabled by switch 340 to provide power to the mobile, and through connection 324, to the portable. Other switches (not shown) may also be connected to activate the regulator 342. Such a combined switch configuration is described in "High Noise Immunity Input Level Detector With Hysterisis", U.S. Pat. No. 4,798,975, assigned to the same assignee and incorporated herein by reference.

A regulator (9.5 to 5V) 325 in the portable supplies the portable with logic power during the intercoupling with the mobile.

The data transfer connections (data transfer bus) 318, 320 and 322 provide for data communication between the portable and the mobile. Although other data transfer schemes could be used, Motorola's "3-wire bus" protocol, as described in U.S. Pat. Nos. 4,369,516 and 4,654,655, incorporated herein by reference, is preferred. Briefly, the first 37 3-wire bus" connection (T) 318 and the second "3-wire bus" connection (C) 320 are used to send data from a u-C 344 in the mobile, while the third "3-wire bus" connection (R) 322 is used to return data to the u-C 344.

Data transfer communication between the mobile and the portable includes data transfer between the mobile u-C 344 and the portable u-Cs 336 and 346. The portable u-C 346 is used primarily for interfacing with the radio user. In response to instructions communicated by the mobile u-C 344, the portable u-C 346 transfers keypad entries from a keypad 350 to the mobile u-C 344 and displays specified data to a display 348 for user viewing.

The portable u-C 336 is similar to the mobile u-C 344 in that both contain the gist of their associated radio's intelligence. Both the portable u-C 336 and the mobile u-C 344 access associated program instruction sets through ROMs 352 and 354, respectively. Both access associated NAM information through EEPROMs 356 and 358, respectively, and both access associated repertory dialing information through EEPROMs 360 and 362, respectively.

The portable u-Cs 336 and 346 and the mobile u-C 344 may be implemented using an MC68HC11, available from Motorola, Inc. A detailed functional description of the u-Cs 336 and 344 is provided below with reference to FIGS. 4 and 5, respectively.

According to the present invention, differences between the mobile and the portable are significant. One difference is that the mobile includes a specially designated RAM 364. The RAM 364 is used, in response to a request from the u-C 344 over the data transfer bus (318, 320 and 322) for storing the portable's NAM information which is downloaded from EEPROM 356 of the portable. Such a data transfer allows the mobile to assume the portable's identity for subsequent communication on the system.

The mobile also accommodates downloading of the portable's repertory dialing information from EEPROM 360. This is accomplished by providing that the mobile's EEPROM 362 is not only used for storing the mobile's repertory dialing information, but also used, in response to a request from the u-C 344 over the data transfer bus (318, 320 and 322), for storing the portable's repertory dialing information which is downloaded from EEPROM 360 of the portable. Preferably, the EEPROM 362 is portioned into individual memory blocks, each of which is dedicated to the particular radio's repertory information according to the radio's associated unique phone number.

An alternative method for the mobile to access the portable's repertory dialing information in EEPROM 360 is for the portable to transfer only the dialing information that is selected at the portable. This would minimize the amount of data to be transferred in situations where the user only requires the mobile for limited usage. For example, consider a situation where the user desires to have the mobile assume the portable's identity for a single phone call. Once the intercoupling is established, the user selects a particular repertory dialing key on the portable (or corresponding key on the mobile). In response, the portable transfers the necessary dialing information to the mobile for transmission via the mobile's transceiver. When the call is complete, the user removes the portable for independent usage.

According to the present invention, by allowing the mobile to employ the portable's NAM and repertory dialing information, the user may employ the mobile as though it were the portable, thus, maintaining the same telephone number and repertory dialing information while preventing simultaneous radio usage of the same phone number.

Another difference between the portable and the mobile is that the transceiver 366, conventional to any portable, may be disabled by the u-C 336. The transceiver 366 is disabled in response to the u-C 336 detecting the availability and selection of the more powerful mobile transceiver 338. The detection is accomplished by the u-C 336 monitoring the 9.5 V connection 324 through a line conditioner circuit 374. The line conditioner 374 may be implemented using a bipolar transistor. Its function is to convert the 9.5 V signal to a binary signal to indicate whether or not the 9.5 V signal is present. The selection of the mobile transceiver 338 automatically occurs after the portable is intercoupled with the mobile and communication is established between the two radios. The selection to employ the mobile transceiver may also be manually implemented by providing for an user code, e.g. key sequence, which is programmed into the portable's keypad 350 to instruct the mobile to enable its transceiver accordingly.

A third difference involves the portable power supply. As previously discussed, the switch 340 on the portable actuates a voltage regulator 342 in the mobile to provide power to the portable during the intercoupling mode. Commensurate with this intercoupling, the power which is internal to the portable, battery 368, is disabled. This is accomplished through the use of a protrusion 370 on the connector. When the intercoupling is made, the protrusion 370 opens a switch 372 which disables internal power from being provided to the portable. While the portable is not intercoupled with the mobile, the switch 372 is normally closed. A diode 351 is connected between the battery 372 and the conditioner 374 to prevent the battery 372 from falsely indicating the presence of the 9.5 V from the mobile.

As previously discussed, one advantage of the radio intercoupling is that the portable is able to employ a number of mobile features which would not otherwise be available. The manner in which the portable employs the mobile's transceiver circuitry has been discussed above. The manner in which the portable employs the mobile's voice-speaker phone and voice recognition and speech synthesis circuitry is now discussed.

The mobile's voice recognition and speech synthesis circuitry is depicted as 380 of FIG. 3. After the radio intercoupling is established, the user enables the mobile's V/SP 380 by either entering a special key L code into the portable's keypad 350 or by speaking a special command into the microphone 220.

Once the mobile's V/SP 380 is enabled, the user employs the speaker 218 and the microphone 220 as normal The V/SP 380 decodes the speaker's verbal commands and provides the decoded information to the u-C 344, which information initiates data transfers to the transceiver 338 and to the portable's display 348.

The V/SP 380 may be implemented by using a conventional voice recognition/speech synthesis system. Exemplary is "Method and Apparatus for Synthesizing Speech for Speech Recognition Templates", described in U.S. Pat. No. 816162, filed on 01/03/86, assigned to the same assignee and incorporated herein by reference. Although the V/SP 380 is shown communicating with the u-C via an independent connection, the data transfer bus (318, 320 and 322) may alternatively be employed.

The mobile's voice-speaker phone operation is utilized by entering a special key code into the portable's keypad 350. When the special key code is recognized by the u-C 344, the u-C 344 instructs the V/SP to enable the speaker 218 and the microphone 220 for the user's use. The speaker 218 and the microphone 220 are disabled either by a second special key code, by disconnecting the portable from the mobile or by lifting a separate handset (connected to the mobile as shown in FIG. 2) offhook.

Figure 4:
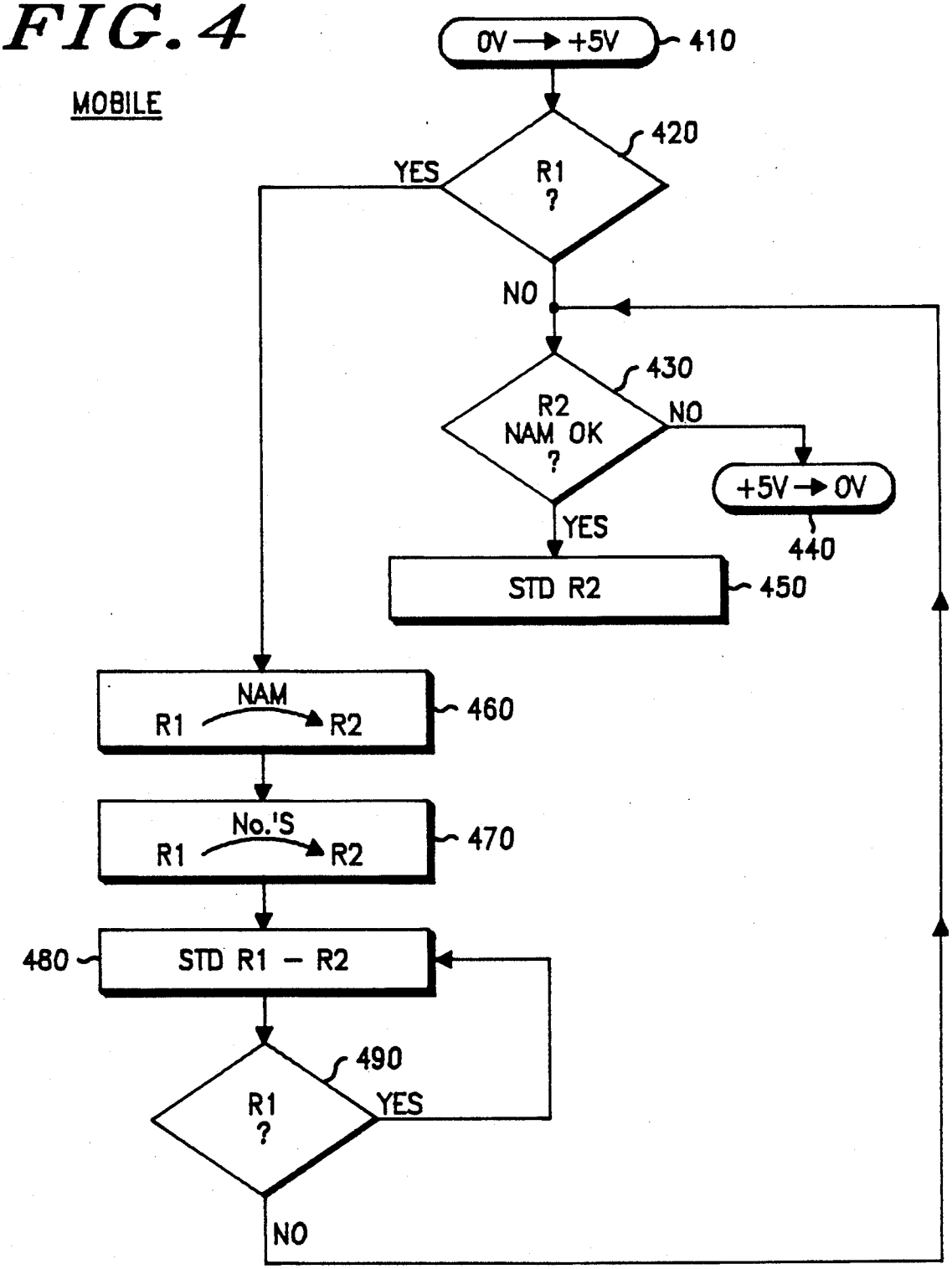
FIG. 4 is a flowchart depicting a set of steps, in accordance with the present invention, which may be used by the microcomputer 344 of FIG. 3 for implementing the present invention with respect to the mobile.

FIG. 4 illustrates a flowchart, in accordance with the present invention, which may be used to implement the operation of the u-C 344 (mobile u-C) of FIG. 3. In both FIGS. 4 and 5, references to the portable appear as R1 and references to the mobile appear as R2. The flowchart begins at block 410 where the power to the mobile and/or the portable is activated. As previously discussed, this is accomplished by momentarily closing switch 340 on the portable or by momentarily closing an on/off switch dedicated directly to the mobile.

At block 420, the mobile u-C determines if the portable is connected to the data transfer bus (318, 320 and 322). The mobile u-C accomplishes this by polling peripherals on the bus (see, eg., U.S. Pat. Nos. 4,369,516 and 4,654,655, supra). Each type of peripheral connected to the bus has an associated bus ID code. The mobile u-C requests a response from each possible peripheral that can be connected to the bus. As applied to the present invention, the mobile u-C requests a response from portable u-C 336 or 346.

As previously discussed, the portable has its own NAM information which may or may not be the same as the mobile's NAM information. Because no two radios with the same NAM information can operate on a cellular system at the same time, the operation of the mobile u-C provides arbitration control to select the radio circuits which are to be shared such that the system's integrity is not disturbed. Once it is established that the portable is connected to the data transfer bus, the remaining steps depicted in the flowchart illustrate the manner in which the mobile u-C provides this arbitration control.

If a response is received from portable u-C 336 or 346, the mobile u-C concludes that an intercoupling between the mobile and portables is established, and flow proceeds from block 420 to block 460 where the mobile begins to assume the portable's identity for subsequent communications on the system.

If a portable u-C does not respond, the mobile u-C concludes that the intercoupling is not established and flow proceeds from block 420 to block 430 where the mobile u-C performs a test to determine if its NAM information is "intact".

The NAM information can be intact in only one circumstance: when the mobile's EEPROM 358 has been pre-programmed with its own NAM information set. Another situation in which the mobile will operate is when the mobile has not been pre-programmed with its own NAM information set, but when the NAM information set of the portable has been downloaded (transferred) into the mobile's RAM memory (364 of FIG. 3).

If the NAM information is not "intact" (not pre-programmed into the EEPROM 358, in which case the mobile's sole purpose is to support the portable), flow proceeds from block 430 to block 440 where the mobile u-C displays an error message to the user via the handset. After sending the error message, the mobile u-C powers down the radio, as indicated at block 440. The NAM information previously stored in the mobile's RAM is lost at power down so that it cannot be used while the portable is not intercoupled.

If the mobile's NAM information is intact, flow proceeds from block 430 to block 450 where standard mobile (stand alone) operation commences.

If the outcome of the intercoupling test performed at block 420 indicates that the portable is intercoupled with the mobile, the mobile u-C requests, via the data transfer bus (318, 320 and 322), for an information transfer by the portable. Such a request is initiated by the mobile so that the portable may take advantage of the mobile characteristics or features.

At block 460, the NAM information which has been pre-programmed into the portable's EEPROM 356 is transferred over the data transfer bus for storage in the mobile's RAM 364. It should be noted that such a transfer could be effected by checking if the data is the same in the RAM 364 and in the EEPROM 356 (e.g., via a cyclic redundancy check (CRC) and, if so, rather than sending the entire data over the bus, sending only a code to inform the u-C of the data integrity.

After the NAM data has been designated for use by the mobile, the repertory dialing information of the portable is transferred in a similar manner. In FIG. 3, the portable repertory dialing information is stored in EEPROM 360. This information is transferred to the mobile's EEPROM 362. Because EEPROM's are non-volatile, such storage will permit repeated usage of this information after powering down the mobile, and avoid the necessity of having to transfer the entire repertory dialing information set each time the radios are intercoupled. Where the data is identical, a CRC check, as discussed above, will so indicate. Where the data is almost identical, the necessity of having to transfer the entire repertory dialing information set may be avoided by implementing the portable to mark changes made since the most recent transfer to the mobile and, thereafter, transferring only the changes.

The foregoing discussion establishes that there are a number of ways to transfer the NAM or repertory dialing information over the data transfer bus. In the case where the data was previously stored in the mobile, such a transfer minimally comprises a code (meaning flag, or signal) designating that the previously stored information should be adopted for use by the mobile. Where none of the data was previously stored in the mobile, the code preferably includes the entire information set so as to designate it for use by the mobile. The transferred repertory dialing information set may be inclusive of all stored phone number or may include only a single requested phone number.

Where the mobile is pre-programmed with its own NAM information, the mobile and the portable may operate independently on the communication system. During such independent operation, the mobile maintains its own repertory dialing information set in EEPROM 362. Because the mobile will eventually reuse the information set, rather than overwriting, the repertory dialing information set which is transferred from the portable is stored in a separate portion of mobile EEPROM 362.

After the NAM and repertory dialing information has been transferred, blow proceeds from block 460 to block 470 where the intercoupled radios commence operation with the mobile circuitry assuming the portable's identity, depicted at block 480. Periodically, the mobile u-C polls the data transfer bus to ensure that the portable is still intercoupled, depicted at block 490. Once the intercoupling is broken, at block 490, the mobile u-C destroys NAM information was downloaded from the portable and returns to block 430 to avoid possible system contention with the portable.

FIG. 5 illustrates a flowchart, in accordance with the present invention, which may be used to implement the operation of the u-C 336 of FIG. 3. The flowchart begins at block 510 where the power to the portable is switched on.

At block 512 a test is performed to determine if 9.5 Volts is present at the connection 324. If 9.5 Volts is not present, the portable concludes that it is operating in its stand alone (not intercoupled) mode and employs its internal battery for power, depicted at block 514. If 9.5 Volts is present, then the portable concludes that the intercoupling is established and flow proceeds to block 516.

At block 516, the portable attempts to communicate with the mobile on the data transfer bus. If communication cannot be validly established, the portable operates in its stand alone mode using the 9.5 V power provided at the connection 324, depicted at block 520, thereby operating as a portable with an external supply. If communication is established, flow proceeds to block 522 where the portable monitors the data transfer bus for a request from the mobile to download its NAM information set. Once the request is made, flow proceeds to block 524 where the transfer is made as previously described.

At block 526, the portable monitors the data transfer bus for a request from the mobile to download its repertory dialing information set. Once the request is made, flow proceeds to block 528 where the transfer is made as previously described.

At block 530, the portable inactivates its transceiver so that the more potent mobile transceiver may be utilized.

At block 532, the mobile begins to assume the portable's identity for subsequent communication on the system.

In either of the flowcharts illustrated in FIGS. 4 or 5, once power is no longer provided to the radio, radio operation resumes at the top of each flowchart (blocks 410 and 510) where power is reactivated.

The present invention therefore provides a technique for intercoupling a mobile and a portable operating in a radio system such that the various circuits (including the associated stored information) of the radios are shared. The intercoupling technique accommodates the user's need for employing commonly owned portable and mobiles, in which case the mobile may be used solely to support the portable. The technique also accommodates the need for employing the user's portable with another's mobile, in which case the mobile is implemented to operate either by itself or in a support role for any portable having the intercoupling features described herein. In any case, the best features of both the portable and mobile may easily be combined for the convenience of the user.

It will be understood by those skilled in the art that various other modifications and changes may be made to the present invention without departing from the spirit and scope thereof.

What is claimed is:

1. A radio arrangement for communicating on a radio system having at least one fixed site and a plurality of radio units, the arrangement comprising:
   a first radio unit having at least one information set for establishing a radio frequency communication link between itself and a fixed site;
   a second radio unit having a second information set for establishing a radio frequency communication link between itself and a fixed site; and
   intercoupling means for intercoupling said first and second radio units and for allowing said first and second radio units to transfer a code therebetween, which code designates said first information set to be used by said second radio unit for communication with a fixed site during said intercoupling.

2. A radio arrangement, according to claim 1, wherein said first information set includes said first radio unit identification information.

3. A radio arrangement, according to claim 1, wherein said first radio unit is a portable radiotelephone and said second radio unit is a mobile radiotelephone.

4. A radio arrangement, according to claim 3, further including means for enabling mobile feature control from the portable when the mobile uses said first information set.

5. A radio arrangement, according to claim 1, wherein said intercoupling means further includes means for storing said first information set in said second radio unit.

6. A radio arrangement, according to claim 5 wherein said intercoupling means further includes means for determining when said first and second radio units are no longer intercoupled, for selecting said stored first information set from said second radio unit, and for designating said second radio unit to use said second information set for subsequent communication with a fixed site.

7. A radio arrangement, according to claim 1, wherein said intercoupling means further includes means for determining when said first and second radio units are no longer intercoupled and for designating said second radio unit to use said second information set for subsequent communication with a fixed site.

8. A radio arrangement for communicating on a radio system having at least one fixed site and a plurality of radio units, the arrangement comprising:
   a first radio unit having a first set of radio circuits enabling radio communications with a fixed site;
   a second radio unit having a second set of radio circuits enabling radio communications with a fixed site;
   intercoupling means for intercoupling said first and second radio units and for allowing said first and second radio units to transfer one or more signals therebetween; and
   arbitration means, disposed within said second radio unit and responsive to said first radio unit being connected to said second radio unit through said intercoupling means, for selecting said first set of radio circuits for use by said second radio unit.

9. A radio arrangement, according to claim 8, wherein said one or more signals transferred include signals indicative of radio identification information.

10. A radio arrangement, according to claim 9, wherein said arbitration means includes means, responsive to said first radio unit being connected to said second radio unit, for changing said radio identification information used by said second radio unit.

11. A radio arrangement, according to claim 8 wherein said first set of radio circuits further includes transceiver circuitry and power supply circuitry.

12. A radio arrangement, according to claim 8, wherein said first set of radio circuits further includes an on/off switch which activates power to the second radio.

13. In a cellular-type radio communication system having at least one fixed site radio station transceiver linked with a master cellular type switching center which is in turn linked with a local telephone central switching office, wherein the fixed site radio station transceiver provides a wireless communication link with a base station transceiver, a radio arrangement for communicating on the cellular-type radio communication system, comprising:
   a first radio having a first serial number and a first telephone number which are needed for establishing a communication link with a fixed site radio station transceiver;
   a second radio having a second serial number and a second telephone number which are needed for establishing a communications link with a fixed site ratio station transceiver; and
   intercoupling means for intercoupling said first and second radios and for allowing said first and second radios to transfer a code therebetween, which code designates said first serial number and said first telephone number to be used by said second radio for subsequent communication with a fixed site radio station transceiver.

14. A radio arrangement for communicating on the cellular-type radio communication system, according to claim 13, wherein said intercoupling means further includes means for determining when said first and second radios are no longer intercoupled and for designating said second radio to use said second serial number and said second telephone number for subsequent communication with a fixed site radio station transceiver.

15. A radio arrangement for communicating on the cellular-type radio communication system, according to claim 13, wherein said intercoupling means further includes means for storing said first serial number and said first telephone number in said second radio.

16. A radio arrangement for communicating on the cellular-type radio communication system, according to claim 15 wherein said intercoupling means further includes means for determining when said first and second radios are no longer intercoupled, for deleting said stored first serial number and first telephone number from said second radio, and for designating said second radio to use said second serial number and said second telephone number for subsequent communication with a fixed site radio station transceiver.

17. In a cellular-type radial communication system having at least one fixed site radio station transceiver linked with a master cellular type switching center which is in turn linked with a local telephone central switching office, wherein the fixed site radio station transceiver provides a wireless communication link with a base station transceiver, a radio arrangement for communicating on the cellular-type radio communication system, the arrangement comprising:
   a portable capable of independent operation of the radio system and having a first serial number and a first telephone number which are needed for establishing a communication link with the fixed site radio station transceiver;
   a mobile capable of independent operation on the radio system and having a second serial number and a second telephone number which are needed for establishing a communications link with the fixed site radio station transceiver; and
   intercoupling means for intercoupling said portable and mobile and for allowing said portable and mobile to transfer at least one code therebetween;
   wherein said mobile includes arbitration means, responsive to said code transferred over said intercoupling means, for selecting said first serial number and said first telephone number for use by said mobile in subsequent communication with the fixed site radio station transceiver.

18. A radio arrangement for communicating on the cellular-type radio communication system, according to claim 17, wherein said arbitration means further includes means for determining when said portable and said mobile are no longer intercoupled and for designating said mobile to use said second serial number and said second telephone number for subsequent communication with the fixed site radio station transceiver.

19. A radio arrangement for communicating on a radio system having at least one fixed site and a plurality of radio units, the arrangement comprising:
   a first radio unit having programmed repertory dialing information to be communicated to a fixed site;
   a second radio unit; and
   intercoupling means for intercoupling said first and second radio units and for allowing said first radio unit to transfer a code to said second radio unit, which code designates said repertory dialing information, whereby said second radio unit adopts the repertory dialing information of said first radio unit for usage in communication with a fixed site during said intercoupling.

20. A radio arrangement, according to claim 19, wherein said second radio unit includes said first radio's repertory dialing information stored therein.

21. A radio arrangement, according to claim 20, wherein said first radio unit is a portable and said second radio unit is a mobile.

22. A radio arrangement, according to claim 19, wherein said intercoupling means further includes means for determining when said first and second radio units are no longer intercoupled and for designating said second radio unit to no longer use the repertory dialing information of said first radio unit in subsequent communication with a fixed site.

23. A radio arrangement for communicating on a radio system at least one fixed site and a plurality of radio units, the arrangement comprising:
   a first radio unit having a first transceiver for enabling radio communications with a fixed site;
   a second radio unit having a second radio transceiver for enabling radio communications with a fixed site; and
   intercoupling means for intercoupling said first radio unit to said second radio unit such that said first radio unit employs said second transceiver for radio communications with a fixed site during said intercoupling.

24. A radio arrangement, according to claim 23, further including a data transfer in said intercoupling means, a first microcomputer in said first radio unit, and a second microcomputer in said second radio unit, wherein said first microcomputer and said second microcomputer communicate via said data transfer bus.

25. A radio arrangement, according to claim 23, wherein said intercoupling means further includes at least one audio connections for transferring audio between said first radio unit and said second radio unit.

26. A radio arrangement, according to claim 23, wherein said intercoupling means further includes means for determining when said first and second radio units are no longer intercoupled and for designating said second radio unit to use said second transceiver for subsequent radio communications with a fixed site.

27. In a radio arrangement having a portable for communicating with a fixed site of a multi-site radio system, a mobile, comprising:
   intercoupling means having connections for intercoupling the portable and the mobile such that signals are transferable between the portable and the mobile;
   a transceiver for establishing a communication link with the fixed site; and
   means for coupling the intercoupling means' connections to the transceiver, wherein said signals transferable between the portable to the mobile are communicated, at least in representative form, to the fixed site through the transceiver while the portable and mobile are intercoupled.

28. A mobile, according to claim 27, wherein the intercoupling means includes means for transferring audio signals between the portable and the mobile.

29. A mobile, according to claim 27, wherein the intercoupling means includes means for transferring data between the portable and the mobile.

30. A mobile, according to claim 27, wherein the signals include data representative of repertory dialing information.

31. A mobile, according to claim 27, wherein the signals include data representative of radio identification information.

32. In a radio arrangement having a mobile for communicating with a fixed site of a multi-site radio system, a portable, comprising:
   memory means for storing radio identification information needed for establishing a communication link to a fixed site;
   intercoupling means for intercoupling the portable and the mobile;
   processing means for transferring one or more codes indicative of the radio identification information to the mobile via the intercoupling means such that the mobile adopts the identification information for communication to a fixed site while the portable and mobile are intercoupled.

33. A portable, aCcording to claim 32, wherein the intercoupling means includes means for transferring audio signals between the portable and the mobile.

34. A portable, according to claim 32, wherein the data represents repertory dialing information.

35. In a cellular-type radio communication system having at least one fixed site radio station transceiver linked with a master cellular type switching center which is in turn linked with a local telephone central switching office, wherein the fixed site radio station transceiver provides a wireless communication link with a base station transceiver, a method of employing a portable and a mobile to communicate with a fixed site radio station transceiver of the cellular-type radio communication system, comprising the steps of:
   providing a portable having stored therein a first identification information set needed for establishing a communication link to a fixed site radio station transceiver;
   providing a mobile having stored therein a second identification information set needed for establishing a communication link to a fixed site radio station transceiver;
   intercoupling the portable and mobile; and
   transferring a code from the portable to the mobile designating said first identification information set to be used by the mobile for communication to a fixed site radio station transceiver while the portable and mobile are intercoupled.

36. A method, according to claim 35, including the step of providing said portable with a repertory dialing information set stored therein.

37. A radio arrangement for communicating on a radio system having at least one fixed site and a plurality of radio units, the radio arrangement comprising:
   a first radio unit having at least as first information set for establishing a radio frequency communications link between said first radio unit and a fixed site;
   a second radio unit having a second information set for establishing a radio frequency communications link between said second radio unit and a fixed site;
   means for intercoupling said first and second radio units; and
   means for designating said first instruction set to be used by said second radio unit for communication with a fixed site during said intercoupling.

* * * * *